United States Patent
Sinha et al.

(10) Patent No.: US 12,474,907 B2
(45) Date of Patent: Nov. 18, 2025

(54) METHOD AND SYSTEM FOR MATCHING SOURCE CODE AND BINARY CODE

(71) Applicant: Tata Consultancy Services Limited, Mumbai (IN)

(72) Inventors: Sanket Achal Sinha, Pune (IN); Venkata Rajan Mindigal Alasingara Bhattachar, Bangalore (IN); Vaibhav Harihar Agasti, Pune (IN); Kumar Mansukhlal Vidhani, Pune (IN); Sachin Premsukh Lodha, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 208 days.

(21) Appl. No.: 18/408,164

(22) Filed: Jan. 9, 2024

(65) Prior Publication Data
US 2024/0289102 A1 Aug. 29, 2024

(30) Foreign Application Priority Data
Feb. 24, 2023 (IN) ............................ 202321012791

(51) Int. Cl.
*G06F 8/41* (2018.01)
(52) U.S. Cl.
CPC .................. *G06F 8/433* (2013.01)
(58) Field of Classification Search
CPC ...................................................... G06F 8/433
See application file for complete search history.

(56) References Cited

U.S. PATENT DOCUMENTS

2024/0211225 A1\* 6/2024 Sevcenko ................ G06F 8/53

FOREIGN PATENT DOCUMENTS

| CN | 116069386 A | \* | 5/2023 | ............... G06F 8/73 |
| EP | 4220382 A1 | \* | 8/2023 | ............. G06F 8/447 |
| GB | 2420638 A | \* | 5/2006 | ............... G06F 8/72 |

OTHER PUBLICATIONS

Yi Gui et al. "Cross-Language Binary-Source Code Matching with Intermediate Representations ", [Online], pp. 601-612, [Retrieved from Internet on Sep. 15, 2025], < https://ieeexplore.ieee.org/stamp/stamp.jsp?tp=&arnumber=9825768>, (Year: 2022).\*

(Continued)

*Primary Examiner* — Ziaul A Chowdhury
(74) *Attorney, Agent, or Firm* — Finnegan, Henderson, Farabow, Garrett & Dunner, LLP

(57) ABSTRACT

State of the art code matching approaches have the disadvantage that they rely on the line numbers provided by source code and binary parsers to establish mapping and do not work since changes introduced by compiler may be much more complex. Some approaches do not work as the source code of application and its binary version may not share the vocabulary. Machine learning based techniques have the disadvantage that they require significant amount of training data, which may not be available in abundance. Method and system disclosed herein provide a mechanism matching score for each of a plurality of code fragments in the intermediate representation of the source code file for each of a plurality of binary fragments in the intermediate representation of the binary file.

12 Claims, 7 Drawing Sheets

(56) References Cited

OTHER PUBLICATIONS

Aslanyan, Hayk et al., "Bin2Source: Matching Binary to Source Code", Title of the item: Ivannikov Ispras Open Conference (ISPRAS), Date: 2021, vol. 18; Issue: 4, Publisher: IEEE.

Gui, Yi et al., "Cross-Language Binary-Source Code Matching with Intermediate Representations", Date: 2022, Link: https: 01.07420. pdf.

Ji, Yuede et al., "BugGraph: Differentiating Source-Binary Code Similarity with Graph Triplet-Loss Network", Title of the item: Asia CCS '21, Date: 2021, Publisher: Association for Computing Machinery, Link: https:/dl.acm.org/doi/pdf/10,11 37633.

Miyani, Dhaval et al., "BinPro: A Tool for Binary Source Code Provenance", Date: 2017, Link: https://arxiv.org/pdf/1711.00830. pdf.

\* cited by examiner

```
public static void main (java.lang.string[])
{
    java.lang.StringBuilder $stack4, $stack6;
    java.lang.String $stack5, $stack7;
    java.io.PrintStream $stack8;
    java.lang.String[] args args := @parameter0: java.lang.string[];

$stack4 = new java.lang.StringBuilder $stack5 = staticinvoke <java.lang.String: java.lang.String valueOf (java.lang.Object)> ("Hello")

specialinvoke $stack4. <java.lang.StringBuilder: void <init> (java.lang.String)> ($stack5);

$stack6 = virtualinvoke $stack4. <java.lang.StringBuilder: > java.lang.StringBuilder append
    (java.lang.String) > ("World")

$stack7 = virtualinvoke $stack6. <java.lang.StringBuilder: java.lang. String toString()>();

$stack8 = <java.lang.System: java.io.PrintStream Out>;
    virtualinvoke $stack8.<java.io.PrintStream: void println (java.lang.String)> ($stack7);
    return;
}
```

```
public static void main (String[] args) {
    String x, y, z;
    x = "Hello";
    y = "World";
    z = x+y;
    System.out.println(z);
}
```

FIG. 5A

METHOD AND SYSTEM FOR MATCHING SOURCE CODE AND BINARY CODE

PRIORITY CLAIM

This U.S. patent application claims priority under 35 U.S.C. § 119 to: Indian Patent Application No. 202321012791, filed on Feb. 24, 2023. The entire contents of the aforementioned application are incorporated herein by reference.

TECHNICAL FIELD

The disclosure herein generally relates to code processing, and, more particularly, to a method and system for matching source code and binary code.

BACKGROUND

Code matching/comparison is carried out as part of code processing, so as to interpret codes and while attempting to identify errors in codes. For example, such a code comparison activity may be helpful in identifying errors, if any, and in performing code corrections. Though various approaches exist for code comparison, they have the disadvantage that they rely on the line numbers provided by source code and binary parsers to establish this mapping and do not work since changes introduced by compiler may be much more complex. Some of the approaches rely on edit distance-based metric, however, this approach may not work as the source code of application and its binary version may not share the vocabulary. Therefore, the edit distance-based approach will not assign the right score to a binary fragment which is the correct matching of its source code counterpart. Some other solutions use machine learning technique for code processing, however, have the disadvantage that they require significant amount of training data, which may not be available in abundance.

SUMMARY

Embodiments of the present disclosure present technological improvements as solutions to one or more of the above-mentioned technical problems recognized by the inventors in conventional systems. For example, in one embodiment, a processor implemented method is provided. Initially, a source code file and a binary file of an application are received as an input, via one or more hardware processors. Further, an intermediate representation of the source code is generated via the one or more hardware processors. Further, an intermediate representation of the binary file is generated via the one or more hardware processors. Further, a matching score is generated for each of a plurality of code fragments in the intermediate representation of the source code for each of a plurality of binary fragments in the intermediate representation of the binary file, via the one or more hardware processors. Generating the matching score includes the following steps. An equivalence between two fragments is computed by comparing individual parts of program statements in the intermediate representation of the source code and the intermediate representation of the binary file. Further, a plurality of operations in the intermediate representation of the source code and the intermediate representation of the binary file is linked, based on a determined data dependency between the program statements in the intermediate representation of the source code and the intermediate representation of the binary file. Further, the matching score is generated based on a) the computed equivalence between a plurality of the fragments, and b) the linking between the plurality of operations. The matching score thus generated maybe then refined if more than one program segment being identified as having same matching score, via the one or more hardware processors. Further, each of a plurality of code fragments is matched with associated one or more of the plurality of binary fragments, based on the refined matching score, via the one or more hardware processors.

In another aspect, refining the generated matching score includes sorting the plurality of program statements of the binary code based on line number values, computing an order value based on the sorted program statements for the input operation, computing an order in the source program for generating a list of occurrences of the input operation, and indexing the computed order value into the generating a list of occurrences to obtain a required source program fragment.

In another aspect, a system is provided. The system includes one or more hardware processors, a communication interface, and a memory storing a plurality of instructions. The plurality of instructions cause the one or more hardware processors to receive a source code file and a binary file of an application as an input. Further, an intermediate representation of the source code is generated via the one or more hardware processors. Further, an intermediate representation of the binary file is generated via the one or more hardware processors. Further, a matching score is generated for each of a plurality of code fragments in the intermediate representation of the source code for each of a plurality of binary fragments in the intermediate representation of the binary file, via the one or more hardware processors. Generating the matching score includes the following steps. An equivalence between two fragments is computed by comparing individual parts of program statements in the intermediate representation of the source code and the intermediate representation of the binary file. Further, a plurality of operations in the intermediate representation of the source code and the intermediate representation of the binary file is linked, based on a determined data dependency between the program statements in the intermediate representation of the source code and the intermediate representation of the binary file. Further, the matching score is generated based on a) the computed equivalence between a plurality of the fragments, and b) the linking between the plurality of operations. The matching score thus generated maybe then refined if more than one program segment being identified as having same matching score, via the one or more hardware processors. Further, each of a plurality of code fragments is matched with associated one or more of the plurality of binary fragments, based on the refined matching score, via the one or more hardware processors.

In yet another aspect, the system refines the generated matching score by sorting the plurality of program statements of the binary code based on line number values, computing an order value based on the sorted program statements for the input operation, computing an order in the source program for generating a list of occurrences of the input operation, and indexing the computed order value into the generating a list of occurrences to obtain a required source program fragment.

In yet another aspect, a non-transitory computer readable medium is provided. The non-transitory computer readable medium includes a plurality of instructions which when executed, cause one or more hardware processors to receive a source code file and a binary file of an application as input.

Further, an intermediate representation of the source code is generated via the one or more hardware processors. Further, an intermediate representation of the binary file is generated via the one or more hardware processors. Further, a matching score is generated for each of a plurality of code fragments in the intermediate representation of the source code for each of a plurality of binary fragments in the intermediate representation of the binary file, via the one or more hardware processors. Generating the matching score includes the following steps. An equivalence between two fragments is computed by comparing individual parts of program statements in the intermediate representation of the source code and the intermediate representation of the binary file. Further, a plurality of operations in the intermediate representation of the source code and the intermediate representation of the binary file is linked, based on a determined data dependency between the program statements in the intermediate representation of the source code and the intermediate representation of the binary file. Further, the matching score is generated based on a) the computed equivalence between a plurality of the fragments, and b) the linking between the plurality of operations. The matching score thus generated maybe then refined if more than one program segment being identified as having same matching score, via the one or more hardware processors. Further, each of a plurality of code fragments is matched with associated one or more of the plurality of binary fragments, based on the refined matching score, via the one or more hardware processors.

In another aspect, the non-transitory computer readable medium causes the one or more hardware processors to refine the generated matching score by sorting the plurality of program statements of the binary code based on line number values, computing an order value based on the sorted program statements for the input operation, computing an order in the source program for generating a list of occurrences of the input operation, and indexing the computed order value into the generating a list of occurrences to obtain a required source program fragment.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIGS. 5A, 5B, and 5C depict example code fragments, according to some embodiments of the present disclosure.

DETAILED DESCRIPTION

Figure 1:
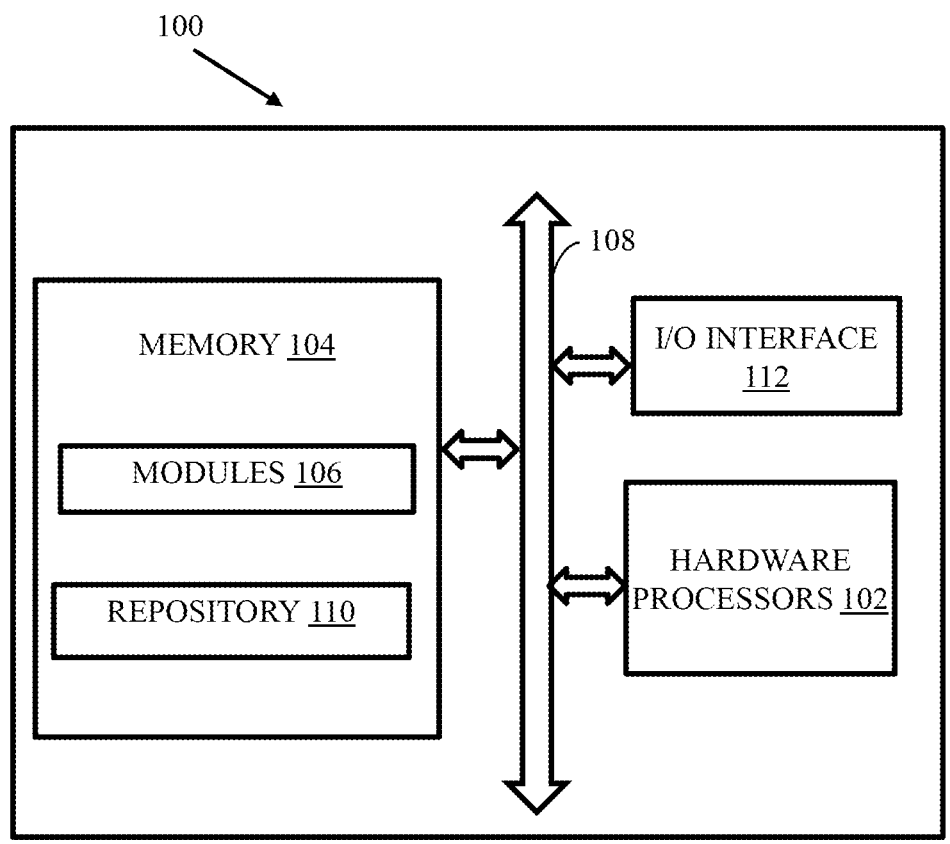
FIG. 1 illustrates an exemplary system for code matching, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

State of the art code matching approaches have the disadvantage that they rely on the line numbers provided by source code and binary parsers to establish this mapping and do not work since changes introduced by compiler may be much more complex. Some of the approaches rely on edit distance-based metric, however, this approach may not work as the source code of application and its binary version may not share the vocabulary. Therefore, the edit distance-based approach will not assign the right score to a binary fragment which is the correct matching of its source code counterpart. Some other solutions use machine learning technique for code processing, however, have the disadvantage that they require significant amount of training data, which may not be available in abundance.

In order to address these challenges, a method and system are provided for matching source code and binary code. In this approach, initially, a source code file and a binary file of an application are received as an input. Further, an intermediate representation of the source code file is generated. Further, an intermediate representation of the binary file is generated. Further, a matching score is generated for each of a plurality of code fragments in the intermediate representation of the source code file for each of a plurality of binary fragments in the intermediate representation of the binary file. Generating the matching score includes the following steps. An equivalence between two fragments is computed by comparing individual parts of program statements in the intermediate representation of the source code file and the intermediate representation of the binary file. Further, a plurality of operations in the intermediate representation of the source code file and the intermediate representation of the binary file is linked, based on a determined data dependency between the program statements in the intermediate representation of the source code file and the intermediate representation of the binary file. Further, the matching score is generated based on a) the computed equivalence between a plurality of the fragments, and b) the linking between the plurality of operations. The matching score thus generated maybe then refined if more than one program segment have been identified as having same matching score. Further, each of a plurality of code fragments is matched with associated one or more of the plurality of binary fragments, based on refined matching score.

Referring now to the drawings, and more particularly to FIG. 1 through FIG. 5C, where similar reference characters denote corresponding features consistently throughout the figures, there are shown preferred embodiments and these embodiments are described in the context of the following exemplary system and/or method.

FIG. 1 illustrates an exemplary system for code matching, according to some embodiments of the present disclosure.

The system 100 includes or is otherwise in communication with hardware processors 102, at least one memory such as a memory 104, an I/O interface 112. The hardware processors 102, memory 104, and the Input/Output (I/O) interface 112 may be coupled by a system bus such as a system bus 108 or a similar mechanism. In an embodiment, the hardware processors 102 can be one or more hardware processors.

The I/O interface 112 may include a variety of software and hardware interfaces, for example, a web interface, a graphical user interface, and the like. The I/O interface 112 may include a variety of software and hardware interfaces, for example, interfaces for peripheral device(s), such as a keyboard, a mouse, an external memory, a printer and the like. Further, the I/O interface 112 may enable the system 100 to communicate with other devices, such as web servers, and external databases.

The I/O interface 112 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface 112 may include one or more ports for connecting several computing systems with one another or to another server computer. The I/O interface 112 may include one or more ports for connecting several devices to one another or to another server.

The one or more hardware processors 102 may be implemented as one or more microprocessors, microcomputers, microcontrollers, digital signal processors, central processing units, node machines, logic circuitries, and/or any devices that manipulate signals based on operational instructions. Among other capabilities, the one or more hardware processors 102 is configured to fetch and execute computer-readable instructions stored in the memory 104.

The memory 104 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes. In an embodiment, the memory 104 includes a plurality of modules 106.

The plurality of modules 106 include programs or coded instructions that supplement applications or functions performed by the system 100 for executing different steps involved in the process of code matching, being performed by the system 100. The plurality of modules 106, amongst other things, can include routines, programs, objects, components, and data structures, which performs particular tasks or implement particular abstract data types. The plurality of modules 106 may also be used as, signal processor(s), node machine(s), logic circuitries, and/or any other device or component that manipulates signals based on operational instructions. Further, the plurality of modules 106 can be used by hardware, by computer-readable instructions executed by the one or more hardware processors 102, or by a combination thereof. The plurality of modules 106 can include various sub-modules (not shown). The plurality of modules 106 may include computer-readable instructions that supplement applications or functions performed by the system 100 for the switching between hardware accelerators for model training.

The data repository (or repository) 110 may include a plurality of abstracted piece of code for refinement and data that is processed, received, or generated as a result of the execution of the plurality of modules in the module(s) 106.

Although the data repository 110 is shown internal to the system 100, it will be noted that, in alternate embodiments, the data repository 110 can also be implemented external to the system 100, where the data repository 110 may be stored within a database (repository 110) communicatively coupled to the system 100. The data contained within such external database may be periodically updated. For example, new data may be added into the database (not shown in FIG. 1) and/or existing data may be modified and/or non-useful data may be deleted from the database. In one example, the data may be stored in an external system, such as a Lightweight Directory Access Protocol (LDAP) directory and a Relational Database Management System (RDBMS). Functions of the components of the system 100 are now explained with reference to the steps in flow diagrams in FIG. 2, FIG. 3, and FIG. 4, and the example code segments in FIGS. 5A through 5C.

Figure 2:
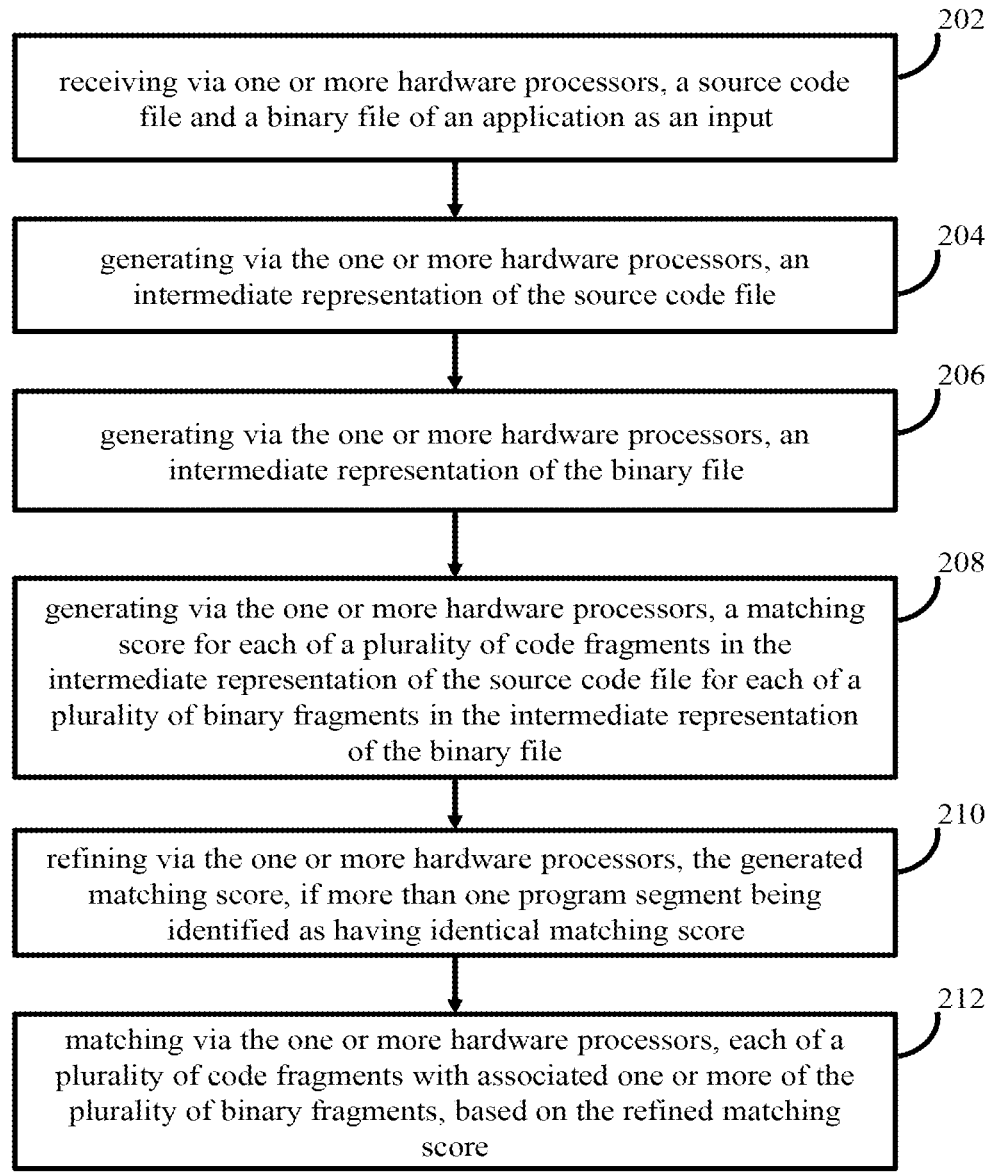
FIG. 2 is a flow diagram depicting steps involved in the process of performing code matching, by the system of FIG. 1, according to some embodiments of the present disclosure.
Figure 3:
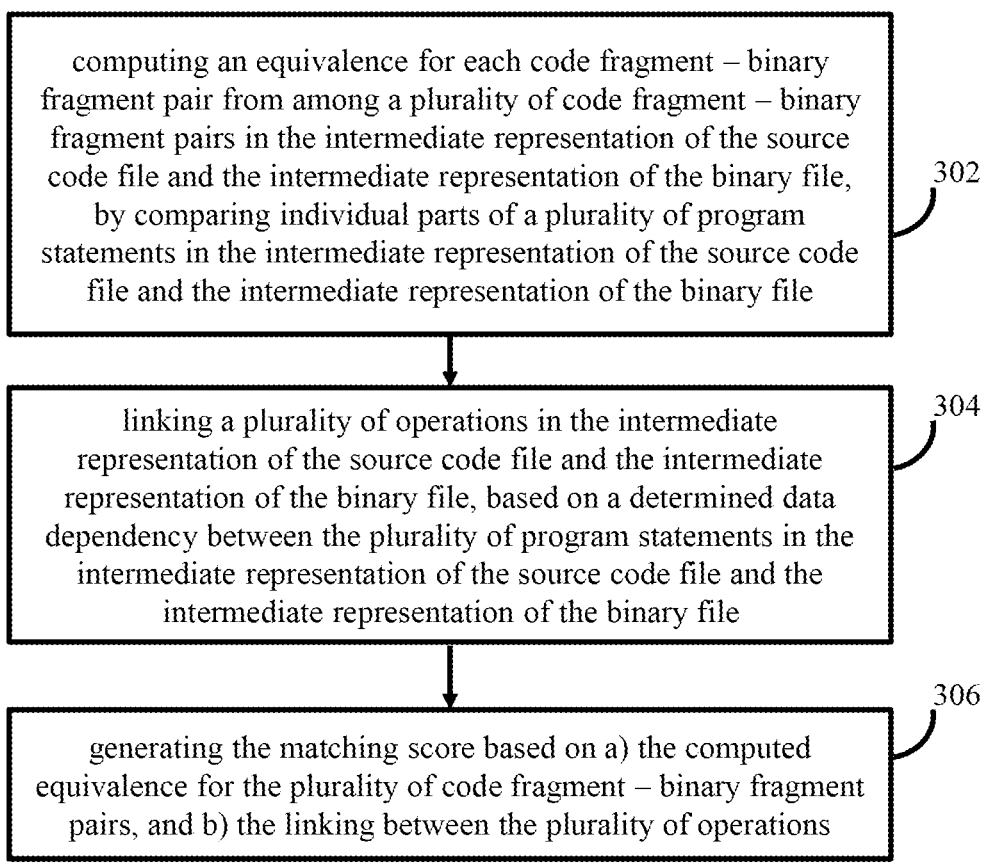
FIG. 3 is a flow diagram depicting steps involved in the process of generating a matching score, by the system of FIG. 1, according to some embodiments of the present disclosure.
Figure 4:
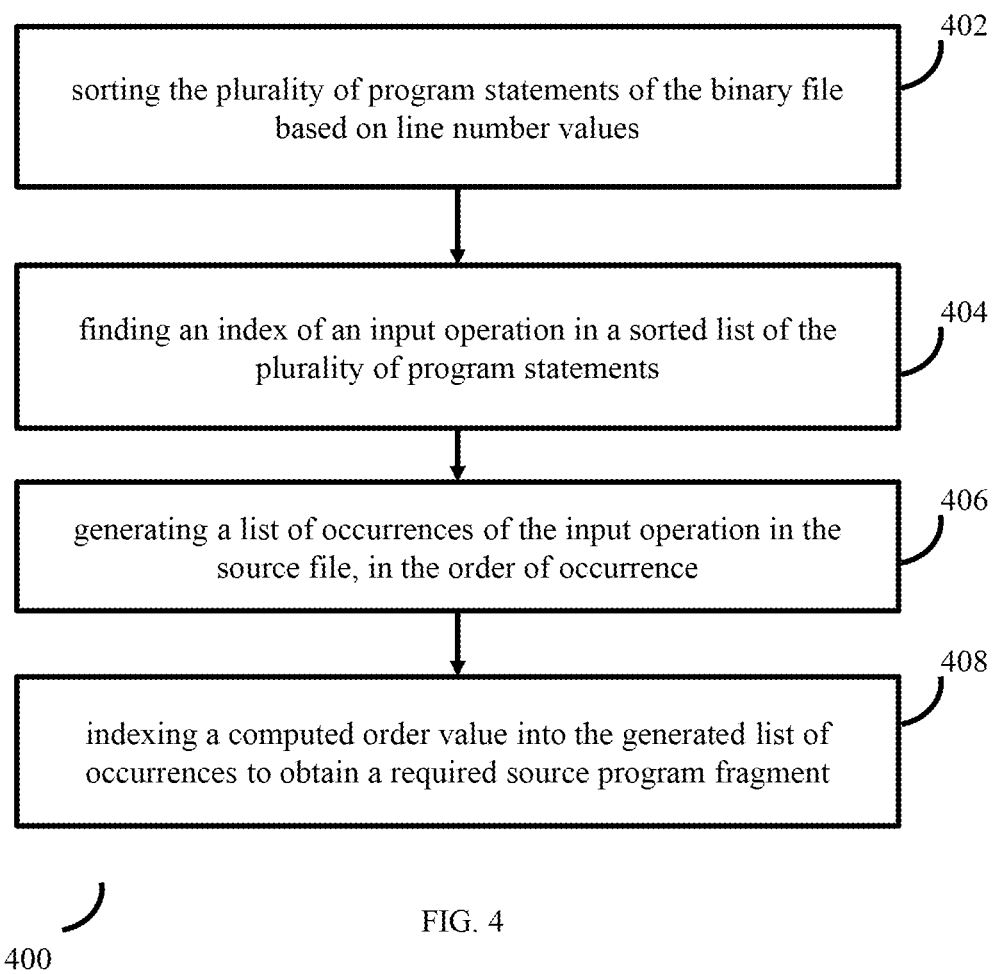
FIG. 4 is a flow diagram depicting steps involved in the process of refining the matching score, by the system of FIG. 1, according to some embodiments of the present disclosure.

FIG. 2 is a flow diagram depicting steps involved in the process of performing code matching, by the system of FIG. 1, according to some embodiments of the present disclosure.

In an embodiment, the system 100 comprises one or more data storage devices or the memory 104 operatively coupled to the processor(s) 102 and is configured to store instructions for execution of steps of the method 200 by the processor(s) or one or more hardware processors 102. The steps of the method 200 of the present disclosure will now be explained with reference to the components or blocks of the system 100 as depicted in FIG. 1 and the steps of flow diagram as depicted in FIG. 2. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

At step 202 of the method 200, the one or more hardware processors 102 of the system 100 are configured to receive a source code file and a binary file of an application as an input. In an embodiment, the source code file, and the binary file may be fetched via a suitable interface, which may be used by a user of the system 100 to upload the source code file and the binary file to the system 100. In another embodiment, the system 100 may automatically fetch the source code file and the binary file, from at least one associated source, wherein the source may be external to the system 100. Further, at step 204 of the method 200, the system 100 generates an intermediate representation of the source code file. In an example embodiment, the system 100 generates the intermediate representation of the source code file by converting a source code in the source code file into an abstract syntax tree representation. The system 100 may use a suitable parser such as an Abstract Syntax Tree (AST) parser, to generate the abstract syntax tree representation. In an embodiment, the system 100 may generate the intermediate representation of the source code file by generating any other suitable representation other than the syntax tree representation. Intermediate representation imparts structure to a program text. This structure is very useful in further processing the input program. The AST representation is used here as it helps break down source code file into smaller fragments like individual statements and allows extraction of useful information like variables and constants used in statements.

Further, at step 206 of the method 200, the one or more hardware processors 102 of the system 100 generate an intermediate representation of the binary file. Generating the intermediate representation of the binary file includes converting the binary file into a Jimple intermediate representation. The system 100 may use a suitable parser to generate the Jimple intermediate representation. In an embodiment, the system 100 may generate the intermediate representation of the binary file by generating any other suitable representation other than the Jimple intermediate representation.

Further, at step 208 of the method 200, the one or more hardware processors 102 of the system 100 generate a matching score for each of a plurality of code fragments in the intermediate representation of the source code file for each of a plurality of binary fragments in the intermediate representation of the binary file. Various steps involved in the process of generating the matching score are depicted in method 300 in FIG. 3, and are explained hereafter. At step 302 of the method 300, the system 100 computing an equivalence for each code fragment—binary fragment pair from among a plurality of code fragment—binary fragment pairs in the intermediate representation of the source code file and the intermediate representation of the binary file, by comparing individual parts of a plurality of program statements in the intermediate representation of the source code file and the intermediate representation of the binary file. At this step, the system computes the equivalence between the two fragments in each code fragment—binary fragment pair, based on extent of similarity of the two fragments. Further, at step 304 of the method 300, a plurality of operations in the intermediate representation of the source code file and the intermediate representation of the binary file is linked, based on a determined data dependency between the program statements in the intermediate representation of the source code file and the intermediate representation of the binary file. The data dependency accounts for missing program statements (or expressions) in the binary representation, which may be restricted to a small region of a program. The system 100 computes the data dependency locally within a procedure and does not extend beyond it. Moreover, the data dependency is computed in the form of pattern matching to extract source program statements that may ultimately generate constant values present in the binary representation. Various steps involved in computing the data dependency by the system 100 are explained hereafter. In order to compute the data dependency, the system 100 initially extracts program variables from a most probable source program statement. Further, an assignment expression is generated using the extracted program variable and a constant value present in the binary representation. Further, the assignment expressions are converted into AST nodes. Further, the AST nodes are matched against all AST nodes of the source program which strictly precedes the most probable program statement. If a match is found then, the program variable is marked. The system 100 processes a definition of an unmarked variable and extracts variables appearing in the right expression of the definition with the following conditions satisfied. Condition 1: The data dependency component ensures the right expression is either binary or unary type, and condition 2: The definition AST node should not be immediately preceded by a predicate node (e.g., if (expr)). For the extracted variables, the steps from assignment expression generation to the variable extraction are iteratively performed, till all the variables are processed.

Further, at step 306 of the method 300, the matching score is generated based on a) the computed equivalence for the plurality of code fragment—binary fragment pairs, and b) the linking between the plurality of operations. The system 100 extracts used variables and constants from representation of the binary statements, and further extracts and uses variables from the most probable source program statement and definitions of extracted variables as computed. The extracted variables and constants from the binary file and the source code file are then matched against each other. For every match, score is incremented by 1 and every variable that matched are marked.

$$\text{Matching Score} = \frac{\text{Score}}{\text{No. of Marked Variables}} \quad (1)$$

It is possible that the different program statements have different matching scores. In another embodiment, one or more of the program statements may have same matching score. The one or more program statements having the same matching score may cause ambiguity when it comes to matching the source code file and the binary file. In order to address this, at step 210 of the method 200, the system 100 refines the matching score generated at step 208, at least for the one or more program segments that have been identified as having the same matching score. Various steps involved in the process of refining the matching score are depicted in method 400 in FIG. 4, and are explained hereafter. In order to refine the generated matching score the system 100 initially sorts the plurality of program statements of the binary code based on line number values, at step 402 of the method 400. Further, at step 404 of the method 400, the system 100 computes an order value based on the sorted program statements for the input operation. Further, at step 406 of the method 400, the system 100 computes an order in the source program for generating a list of occurrences of the input operation. Further, at step 408 of the method 400, the system 100 indexes the computed order value into the generating a list of occurrences to obtain a required source program fragment.

Referring back to the method 200, at step 212, each of a plurality of code fragments is matched with associated one or more of the plurality of binary fragments, based on matching score i.e. the refined matching score if the matching score was refined at step 210, or the matching score generated at step 208. Result of the code comparison and matching maybe then provided to the user, via a suitable interface.

Example Data:

Consider the code fragments in FIG. 5A. The fragment on the left side represents the source code fragment and the one on the right side represents equivalent binary code after converting it to the intermediate representation. Addition operation "+" over string operands 'x' and 'y' is demarcated with the box in the binary code. The addition operation "+" over two strings are translated into a sequence of method calls by the compiler as shown in the code fragment demarcated by the box.

Further, the program statement "z=x+y" of the source code file is compared with all program statements (demarcated by the box) of the binary code fragment. The system 100 may achieve this using a meta mapping maintained by the system 100. In the meta mapping, information such as if the operator is "+" and one of its operands is of string type in source code file then, the "append" function should be searched in its binary, is stored. In other words, for the append function of binary representation the source program statement containing the expression z=x+y becomes the most probable one for mapping.

Further, the data dependency information is computed and used for linking entire sequence of operations starting with the program statement that creates StringBuilder object ($stack4=new java.lang.StringBuilder) up to the program statement stack7=virtualinvoke $stack6.<java.lang.StringBuilder: java.lang.String toString ( )>( ). For example, $stack4=new java.lang.StringBuilder program statement and specialinvoke $stack4.<java.lang.StringBuilder: void <init>(java- .lang.String)>($stack5) are data dependent on each other because variable $stack4 initialized (or defined) in the former program statement is subsequently used in the latter program statement.

From the code mapping depicted above, it is evident that there is no explicit program fragment in the binary representation that can be accounted for the program statements x="Hello" and y="World" as seen in a source representation in the source code file. This may be due to the fact that during the optimization phase of compiler redundant program statements (the statements which can be safely removed without changing meaning of a program) may have been removed. However, to correctly link the program statement "z=x+y" with a sequence of calls as discussed above it is necessary to predict that both program statements namely x="Hello" and y="World" are indeed removed and they are replaced with calls $stack5=staticinvoke <java.lang.String: java.lang.String valueOf(java.lang.Object)>("Hello") and $stack6=virtualinvoke $stack4.<java.lang.StringBuilder: java.lang.StringBuilder append(java.lang.String)>("World") respectively in the binary representation. In order to address this, the data dependency is determined by finding out the definitions of program variables x and y. The data dependency computation is restricted to a small region of a program, and it is invoked only if the following constant value condition is satisfied: an expression in a binary program processes a constant value while the corresponding fragment in a source program is represented without a constant value. In the above example, the program statement $stack5=staticinvoke <java.lang.String: java.lang.String valueOf(java.lang.Object)>("Hello") processes the constant value "Hello" while the source program has x="Hello" and z=x+y program statements. There is no program statement in the binary representation that corresponds to the program statement x="Hello". The system 100 maintains meta information such as addition operation on string variables leads to the generation of a sequence of functions that includes "append" function by compiler and hence, as a result, in the aforementioned example, the demarcated binary fragment is matched only with program statements of type "z=x+y", where x and y are string variables.

For the aforementioned example, output of steps of the method as discussed in [032], used for determining the data dependency, are as follows. The output is marked using braces { }.

Step 1: {x, y} from the most probable program statement z=x+y
Step 2: {x="Hello", x="World", y="Hello", y="World"}
Step 3: AST nodes for step 2 patterns are generated
Step 4: the first assignment expression of step 2 is successfully matched with the program statement x="Hello" of source code AST node and the fourth assignment expression of step 2 y="World" is successfully matched with the program statement of y="World" of source code AST node.
Step 5: Variable x is marked. Variable y is marked.
Step 6: Not executed. All variables are marked.
Step 7: Not executed. All variables are marked.

After determining the data dependency, the matching fragment of the source program is expanded to include x="Hello" and y="World" program statements. Further, the matching score is computed.

Parts matching algorithm discussed above is not specific to only string related operations (e.g., append, Init, valueOf, and so on). In actual implementation, the operation name is passed as a parameter along with a set of indexes for arguments to be processed corresponding to that operation. This is depicted in the example illustrated in FIG. 5B.

As shown, the println operation prints constant value '25' to console. However, there is no exact program statement/fragment in the source code file that prints the value '25'. The most probable program statement prints a value of program variable 'c'. Parts matching algorithm along with data dependency component considers all program statements demarcated by the box in the source program. Moreover, the parts matching algorithm takes 'println' as an input parameter for the operation and a set consisting of single value with value '1' as the operation takes only single argument.

Figure 5B:
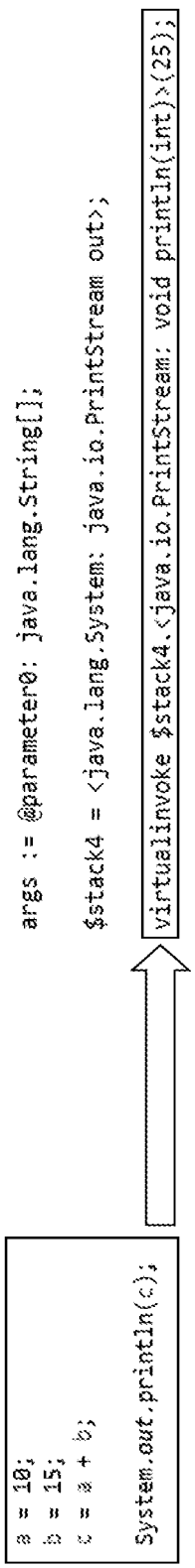
Figure 5C:
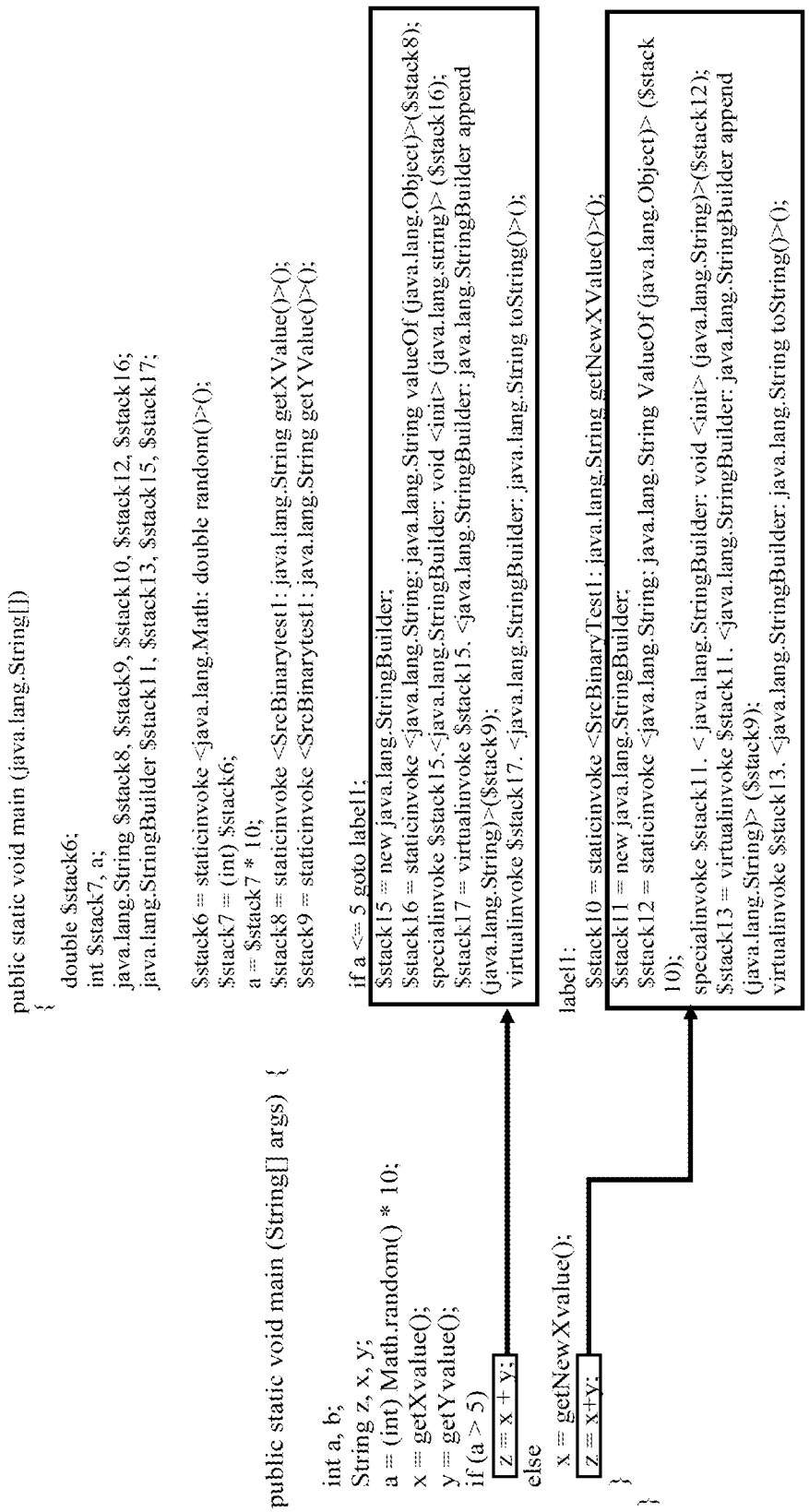

Scenario of different program segments having same matching score is depicted in FIG. 5C. As depicted, z=x+y is repeated in the binary fragment, and they are supposed to map to different segments of the source code file. However, the system 100 may end up computing same matching score for both the source code fragments for each binary fragment demarcated in the boxes. To break the tie, the system 100 refines the matching score. For this purpose, the system 100 may use meta information such as but not limited to append operation corresponds to addition operator for string type variable. At this stage, by considering the line numbers, the system 100 refines the matching score, which results in mapping of the considered source code segments to the corresponding binary code segment.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of mapping of source code in a source code file to binary code in a binary file. The embodiment, thus provides a method and system for code comparison and matching, wherein a matching score is determined for code segments in a source code file and associated binary file. Moreover, the embodiments herein further provide a mechanism of matching between the segments in the source code in the source code file and the associated binary code in the binary file, based on the determined matching score.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:
    receiving, via one or more hardware processors, a source code file and a binary file of an application as an input;
    generating, via the one or more hardware processors, an intermediate representation of the source code file;
    generating, via the one or more hardware processors, an intermediate representation of the binary file;
    generating, via the one or more hardware processors, a matching score for each of a plurality of code fragments in the intermediate representation of the source code file for each of a plurality of binary fragments in the intermediate representation of the binary file, further comprising:
        computing an equivalence for each code fragment—binary fragment pair from among a plurality of code fragment—binary fragment pairs in the intermediate representation of the source code file and the intermediate representation of the binary file, by comparing individual parts of a plurality of program statements in the intermediate representation of the source code file and the intermediate representation of the binary file;
        linking a plurality of operations in the intermediate representation of the source code file and the intermediate representation of the binary file, based on a determined data dependency between the plurality of program statements in the intermediate representation of the source code file and the intermediate representation of the binary file; and
        generating the matching score based on a) the computed equivalence for the plurality of code fragment—binary fragment pairs, and b) the linking between the plurality of operations;
    refining, via the one or more hardware processors, the generated matching score, if more than one program segment being identified as having identical matching score; and
    matching, via the one or more hardware processors, each of a plurality of code fragments with associated one or more of the plurality of binary fragments, based on the refined matching score.

2. The processor implemented method of claim 1, wherein generating the intermediate representation of the source code file comprises converting the source code file into an abstract syntax tree representation.

3. The processor implemented method of claim 1, wherein generating the intermediate representation of the binary file comprises converting the binary file into a Jimple intermediate representation.

4. The processor implemented method of claim 1, wherein refining the generated matching score comprises:
    sorting the plurality of program statements of the binary file based on line number values;
    finding an index of an input operation in a sorted list of the plurality of program statements;
    generating a list of occurrences of the input operation in the source file, in the order of occurrence; and
    indexing a computed order value into the generated list of occurrences to obtain a required source program fragment.

5. A system, comprising:
one or more hardware processors;
a communication interface; and
a memory storing a plurality of instructions, wherein the plurality of instructions cause the one or more hardware processors to:
    receive a source code file and a binary file of an application as an input;
    generate an intermediate representation of the source code file;
    generate an intermediate representation of the binary file;
    generate a matching score for each of a plurality of code fragments in the intermediate representation of the source code file for each of a plurality of binary fragments in the intermediate representation of the binary file, by:

computing an equivalence for each code fragment—binary fragment pair from among a plurality of code fragment—binary fragment pairs in the intermediate representation of the source code file and the intermediate representation of the binary file, by comparing individual parts of a plurality of program statements in the intermediate representation of the source code file and the intermediate representation of the binary file;

linking a plurality of operations in the intermediate representation of the source code file and the intermediate representation of the binary file, based on a determined data dependency between the plurality of program statements in the intermediate representation of the source code file and the intermediate representation of the binary file; and generating the matching score based on a) the computed equivalence for the plurality of code fragment—binary fragment pairs, and b) the linking between the plurality of operations;

refine the generated matching score, if more than one program segment being identified as having identical matching score; and match each of a plurality of code fragments with associated one or more of the plurality of binary fragments, based on the refined matching score.

6. The system of claim 5, wherein the one or more hardware processors are configured to generate the intermediate representation of the source code file by converting the source code file into an abstract syntax tree representation.

7. The system of claim 5, wherein the one or more hardware processors are configured to generate the intermediate representation of the binary file by converting the binary file into a Jimple intermediate representation.

8. The system of claim 5, wherein the one or more hardware processors are configured to refine the generated matching score by:

sorting the plurality of program statements of the binary file based on line number values;

finding an index of an input operation in a sorted list of the plurality of program statements;

generating a list of occurrences of the input operation in the source file, in the order of occurrence; and indexing a computed order value into the generated list of occurrences to obtain a required source program fragment.

9. One or more non-transitory machine-readable information storage mediums comprising one or more instructions which when executed by one or more hardware processors cause:

receiving a source code file and a binary file of an application as an input;

generating an intermediate representation of the source code file;

generating an intermediate representation of the binary file;

generating a matching score for each of a plurality of code fragments in the intermediate representation of the source code file for each of a plurality of binary fragments in the intermediate representation of the binary file, further comprising:

computing an equivalence for each code fragment—binary fragment pair from among a plurality of code fragment—binary fragment pairs in the intermediate representation of the source code file and the intermediate representation of the binary file, by comparing individual parts of a plurality of program statements in the intermediate representation of the source code file and the intermediate representation of the binary file;

linking a plurality of operations in the intermediate representation of the source code file and the intermediate representation of the binary file, based on a determined data dependency between the plurality of program statements in the intermediate representation of the source code file and the intermediate representation of the binary file; and generating the matching score based on a) the computed equivalence for the plurality of code fragment—binary fragment pairs, and b) the linking between the plurality of operations;

refining the generated matching score, if more than one program segment being identified as having identical matching score; and matching each of a plurality of code fragments with associated one or more of the plurality of binary fragments, based on the refined matching score.

10. The one or more non-transitory machine-readable information storage mediums of claim 9, wherein generating the intermediate representation of the source code file comprises converting the source code file into an abstract syntax tree representation.

11. The one or more non-transitory machine-readable information storage mediums of claim 9, wherein generating the intermediate representation of the binary file comprises converting the binary file into a Jimple intermediate representation.

12. The one or more non-transitory machine-readable information storage mediums of claim 9, wherein refining the generated matching score comprises:

sorting the plurality of program statements of the binary file based on line number values;

finding an index of an input operation in a sorted list of the plurality of program statements;

generating a list of occurrences of the input operation in the source file, in the order of occurrence; and indexing a computed order value into the generated list of occurrences to obtain a required source program fragment.

* * * * *